UNITED STATES PATENT OFFICE.

GEORGE STANLEY, OF BOSTON, MASSACHUSETTS.

MAKING OF MOSAICS OF GLASS, PORCELAIN, OR STONE.

SPECIFICATION forming part of Letters Patent No. 257,526, dated May 9, 1882.

Application filed March 24, 1882. (No specimens.)

*To all whom it may concern:*

Be it known that I, GEORGE STANLEY, of Boston, in the county of Suffolk, of the State of Massachusetts, have invented a new and useful Improvement in the Making of Mosaics of Glass, Porcelain, or Stone; and I do hereby declare the same to be described as follows:

In the manufacture of windows or various other articles of stained or colored plate-glass there result many small scraps of pieces, which are usually considered as waste material. My invention has for its object the utilizing of such, or their conversion into mosaic sheets or panes. To this end I first form a bed composed of a mixture of clay and fine sand, and, having leveled the surface thereof, I arrange upon it, while it may be in a moist or adhesive state, the small pieces of glass, taking care to have a narrow channel or space between each and that or those next to it; and in case of not using a metallic or other frame to surround the whole, and to rest on the argillaceous and arenaceous bed, I form with the composition of the bed a wall entirely around and at a short distance from the series or pieces of colored glass; but in case of using such a frame it should encompass the series of pieces, and there should be between them and it a narrow space, which should extend around the entire series. I next cover the upper surfaces of the several pieces of glass with a very thin coating of clay or chalk in solution or mixture with water, such being to prevent adhesion to such surfaces of the joining metal or metallic composition. Next, the bed and the coating are to be slowly dried, after which the whole is to be raised to a temperature equivalent to that required for melting the said joining metal. This joining metal may be lead or the composition known as "type-metal," or, in other words, the metallic composition of lead and antimony usually employed for the manufacture of printing-types. While the bed and glass are in such heated condition I pour thereon molten metal, and cause it to flow freely between the several pieces of glass and around the entire series until the spaces between and about the pieces are entirely filled with the metal. After the metal may have become set or sufficiently hard I remove, by any suitable means, the surplus thereof. The metal thus constitutes a frame for holding such pieces of glass in place relatively to the others next or about it. In this manner I am enabled to make mosaic panes or plates that can be utilized to advantage in the manufacture of windows or screens or various other articles.

The clay and sand may be mixed in or about in equal proportions, and when in a moist state, as well as after being heated, serve to hold the pieces of glass in their due positions. The coating, as described, of the upper surface of the pieces is necessary to prevent adhesion of the metal to them.

What I claim as my invention is—

The mode, substantially as described, of making a mosaic of glass or other mineral substance, such consisting in arranging the pieces, in manner as described, on an argillaceous and arenaceous bed, next coating the upper surfaces of the said pieces with clay or other material suitable to resist adhesion of the joining metal to such surface, next drying the whole and heating it to the temperature of the joining metal when in a molten state, and while such bed and pieces may be at such temperature pouring upon the pieces of glass and into the narrow spaces or channels between and around them lead or a joining metal in a molten state, the whole being subsequently cooled and finished by removal of the surplus metal, as set forth.

GEORGE STANLEY.

Witnesses:
   R. H. EDDY,
   E. B. PRATT.